United States Patent [19]

Busby

[11] Patent Number: 4,736,424
[45] Date of Patent: Apr. 5, 1988

[54] DATA SCRAMBLING APPARATUS

[75] Inventor: W. Ray Busby, Richardson, Tex.

[73] Assignee: Rockwell International Corporation, El Segundo, Calif.

[21] Appl. No.: 910,570

[22] Filed: Sep. 22, 1986

[51] Int. Cl.$^4$ .............................................. H04L 9/00
[52] U.S. Cl. ........................................ 380/50; 380/48
[58] Field of Search .............. 178/22.10, 22.17, 22.18, 178/22.19, 22.13; 380/28, 44, 48, 50, 43

[56] References Cited

U.S. PATENT DOCUMENTS

| | | | |
|---|---|---|---|
| 3,925,612 | 12/1975 | Guanella et al. | 178/22.13 |
| 4,109,856 | 8/1978 | van Beveren et al. | 380/44 |
| 4,304,962 | 12/1981 | Fracassi et al. | 178/22.19 |
| 4,434,322 | 2/1984 | Ferrell | 380/50 |
| 4,447,672 | 5/1984 | Nakamura | 178/22.19 |

Primary Examiner—Salvatore Cangialosi
Assistant Examiner—Aaron J. Lewis
Attorney, Agent, or Firm—Bruce C. Lutz; V. L. Sewell; H. Fredrick Hamann

[57] ABSTRACT

A data scrambler-descrambler combination is illustrated which stores previously modified received data and alters data passing through on the basis of certain of the previously stored data bits. Additionally, the previously stored data is monitored to detect repetitive patterns, which indicate that the scrambler is no longer properly scrambling the signal, and introducing a pattern breaking data bit into the storage means whenever such a pattern is detected.

5 Claims, 2 Drawing Sheets

|   | D | D1 | D2 | 1 | 2 | 3 | 4 | 5 | 6 | 7 | X | PT |
|---|---|----|----|---|---|---|---|---|---|---|---|----|
| A | 0 | 0 | 1 | 0 | 0 | 0 | 0 | 0 | 0 | 0 | 0 | 1 |
| B | 1 | 1 | 1 | 0 | 0 | 0 | 0 | 0 | 0 | 0 | 0 | 0 |
| C | 0 | 1 | 0 | 0 | 1 | 0 | 1 | 0 | 1 | 0 | 1 | 1 |
| D | 1 | 0 | 0 | 0 | 1 | 0 | 1 | 0 | 1 | 0 | 1 | 0 |
| E | 0 | 1 | 1 | 1 | 0 | 1 | 0 | 1 | 0 | 1 | 1 | 0 |
| F | 1 | 0 | 1 | 1 | 0 | 1 | 0 | 1 | 0 | 1 | 1 | 1 |
| G | 0 | 0 | 0 | 1 | 1 | 1 | 1 | 1 | 1 | 1 | 0 | 0 |
| H | 1 | 1 | 0 | 1 | 1 | 1 | 1 | 1 | 1 | 1 | 0 | 1 |

DATA SCRAMBLING APPARATUS

THE INVENTION

The present invention is generally related to electronics and more specifically to data scramblers. Even more specifically, the present invention is related to a data scrambler which checks for the possibility of an effective pattern match between the incoming data to be encoded and the current state of the scrambler register and introduces a pattern breaking bit whenever such a pattern is detected.

BACKGROUND

One example of the prior art is shown in a book entitled "Transmission Systems for Communications" published by members of the technical staff of Bell Telephone Laboratories in the revised fourth edition. On pages 742 to 744, a scrambler design is discussed and illustrated. On page 743, a scrambler is shown which checks for undesirable sequences, such as alternating 0's and 1's, and an all O state. On page 744, there is a statement that additional circuitry would be required if it became necessary to guard against an all logic 1 condition, in addition to the conditions guarded against in the circuitry shown. This approach requires a separate NAND gate, each having as many inputs as register bits, to detect each condition. These must be combined via additional circuitry to produce final control signal. Even then, a variant of the original troublesome bit pattern can still produce the undesired effect.

A self-synchronizing data scrambler suffers from th possibility of having an effective pattern match between the incoming data to be encoded and the current state of the scrambler register. The result of such a match causes an output which is no longer scrambled, but has a repetitive pattern. The probability of such a match is dependent upon the data source with the most likely patterns being an all 1's, an all 0's or an alternating 01 or 10 sequence. The general method in the prior art of preventing this type for scrambler failure, is to provide gates to monitor the register for the suspect patterns, and then either force a modification to the normal register input, or actually change some register bits directly, so as to perturb the pattern. The problem with the first mentioned approach is the possibility that the data pattern can still cause the problem to persist with yet a different pattern. The second prior art approach requires access to the individual register bits, and such access is often inconvenient when dealing with integrated circuits.

The method disclosed herein circumvents both of the above problems and provides pattern lockup protection independent of the data supplied, and further provides proper descrambling of this data.

This problem is circumvented in the present invention by monitoring certain (at least two) of the data bits in the storage register, and altering the logic value of the incoming data bit whenever the monitored bits have a prescribed logic value. Further, selected data bits are logically compared in a simultaneous comparison of a plurality of sets, including the presently supplied data bit, and whenever a given set of conditions is detected, the logic value of the data bit as supplied to the storage mean is altered to break the storage register pattern.

It is therefore an object of the present invention to provide an improved data scrambler, as well as an associated descrambler, to work with the data scrambler.

Other objects and advantages of the present invention will be apparent from a reading of the specification and appended claims in conjunction with the drawings wherein:

DETAILED DESCRIPTION

Figure 1:
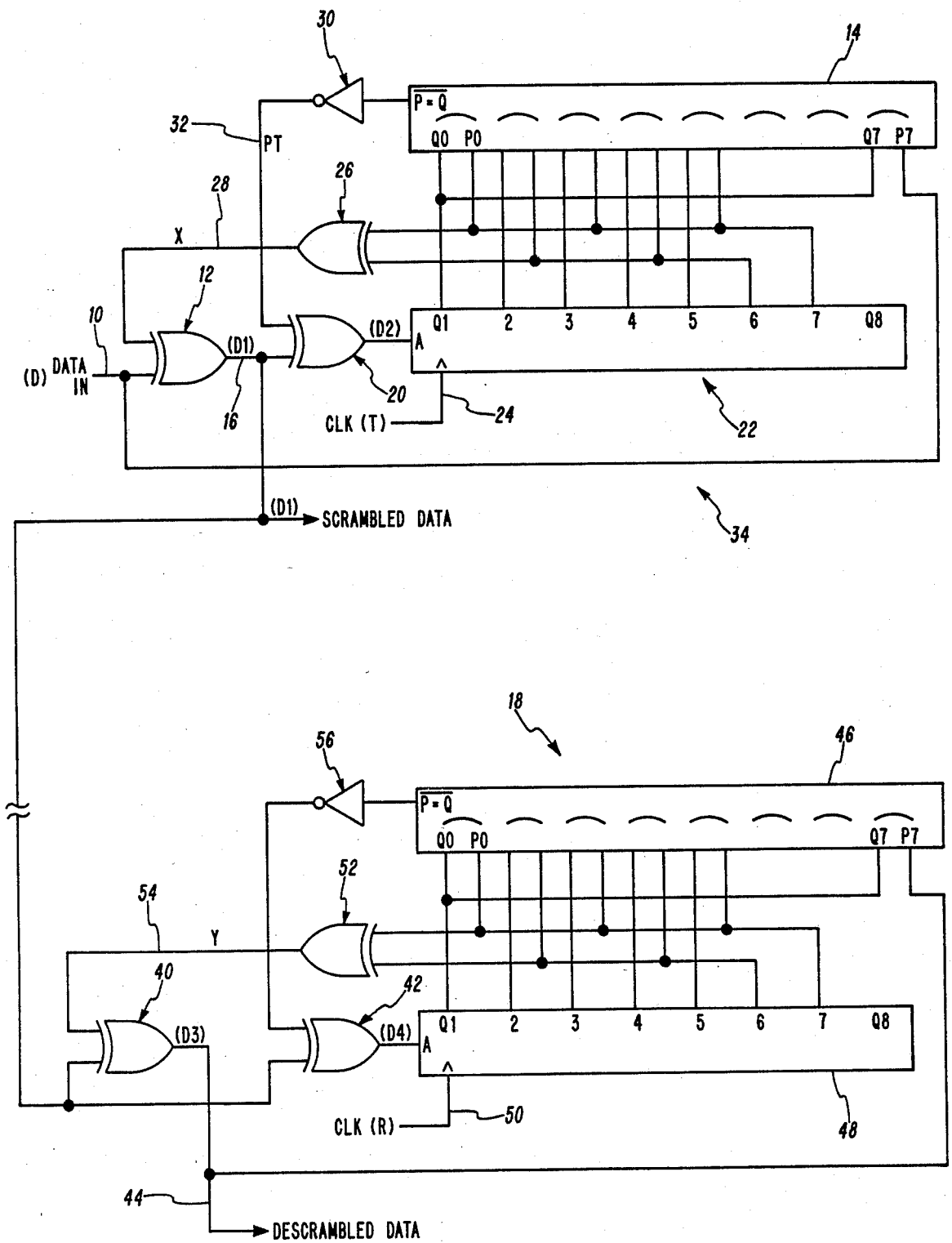
FIG. 1 is a schematic block diagram of a data scrambler and descrambler according to the teachings of the present invention.

A terminal 10 labeled DATA IN supplies data to one input of an EXCLUSIVE OR gate 12, as well as to an input labeled P7 of a comparator logic element 14. An output of EXCLUSIVE OR gate 12 appears on a lead 16 and is supplied as scrambled output data to a descrambler generally indicated a 18 and also to an EXCLUSIVE OR gate 20. The DATA IN data is labeled for other purposes D, whereas the data on lead 16 is labeled D1. The output of EXCLUSIVE OR gate 20 is labeled D2, and is supplied to an A input of a storage register means generally designated as 22. Storage register 22 is illustrated as having eight storage positions, and is a serial-in parallel-out register, of which only seven of the bit positions are used in this embodiment of the invention. It includes a clock input supplied on a lead 24 and has outputs labeled Q1 through 7. Outputs Q1 through 5 of storage means 22 are supplied to corresponding Q inputs of the comparator 14. Output Q6 of register 22 is supplied to inputs P1 and P4 (unlabeled on coaparator 14) and also supplies a first input to an EXCLUSIVE OR gate generally designated a 26. Output Q7 of register 22 is supplied to inputs P0 and unlabeled inputs P3 and P5 of register 14, as well as to a second input of EXCLUSIVE OR gate 26. EXCLUSIVE OR gate 26 supplies an output on a lead 28, (also labeled as an X bit) and to a second input of EXCLUSIVE OR gate 12. The input data 10 is shown supplied to a P7 input of comparator 14, while input Q7 of comparator 14 is connected to the Q1 output of storage means 22. The comparator 14 supplies a logic 0 output if all of the bit sets being compared are alike. In other words, the output is a logic 0 if each of the bit sets are alike, even though different sets may be different logic values. If each of the sets from comparison's 1 through 5 are logic 1's, and Q7 and P7 have logic O's, the output from comparator 14 will still be logic O. This output is inverted by inverter 30 and supplied as a second input PT on lead 32 to EXCLUSIVE OR gate 20. The components described so far comprise a data scrambler generally designated as 34. The output of the scrambled data is supplied through one means or another to a descrambler previously designated as 18 on lead 16. This signal is supplied to EXCLUSIVE OR gates 40 and 42. The output of EXCLUSIVE OR gate 40 comprises descrambled data on lead 44, and this data is also supplied to an input P7 on a comparator 46, which is substantially identical to comparator 14 of scrambler 34. The EXCLUSIVE OR gate 42 has an output labeled D4 supplied to an input of a storage means or register 48 having a clock input on lead 50 and having 8 data bit storage positions with seven of them being utilized. This storage means 48 is comparable to storage means 22 of scrambler 34, and is connected to comparator 46 in the identical manner illustrated in connection with scrambler 34. The outputs Q6 and Q7 are also connected to an EXCLUSIVE OR gate 52 in the same manner as register 22 is connected to EXCLUSIVE OR gate 26. An output of EXCLUSIVE OR gate 52 is labeled a Y output, and is supplied on a lead 54 to a second input of EXCLUSIVE OR gate 40. An output of comparator 46 is supplied to an inverter circuit 56 whose output is supplied as a second input to EXCLUSIVE OR gate 42.

Figures 2, 3:
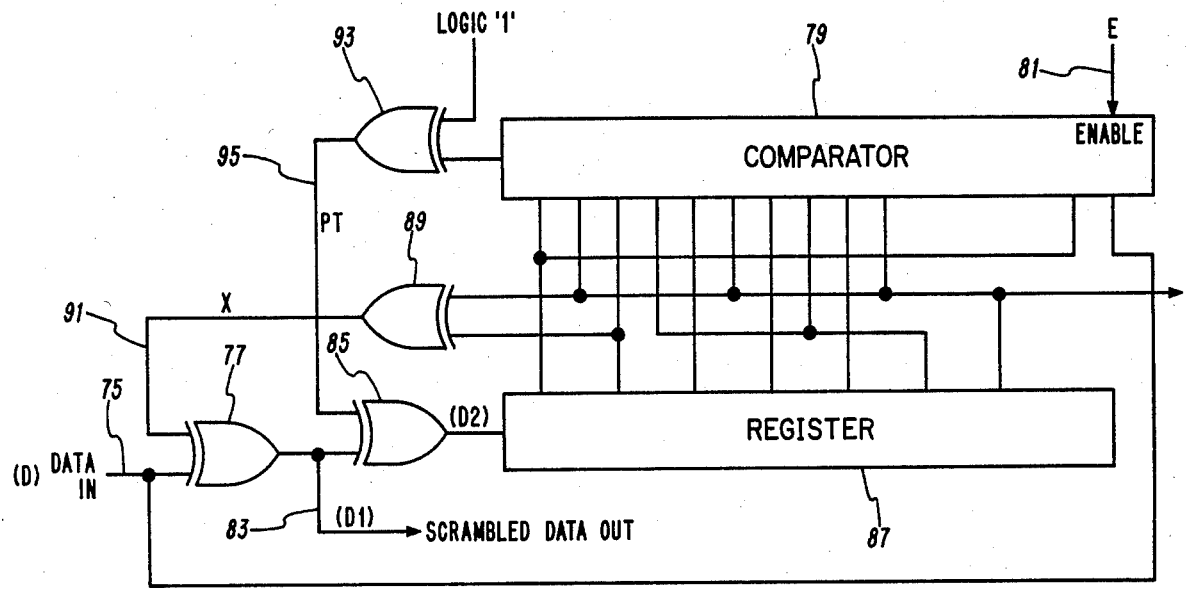
FIG. 2 is a block schematic diagram of another embodiment of the data scrambler of FIG. 1.
FIG. 3 is a set of logic bit values to be used in explaining the operation of either FIG. 1 or FIG. 2.

In FIG. 2, a data input line labeled D and also designated as 75, supplies signals to an EXCLUSIVE OR gate 77, as well as to an input on a comparator block 79. Although unlabeled, the comparator block 79 is constructed substantially identically to that labeled 14 in FIG. 1. It additionally includes an enable input 81. An output of EXCLUSIVE OR gate 77 is supplied on a lead 83 to an EXCLUSIVE OR gate 85 as well as providing D1 scrambled data output signals. An output of EXCLUSIVE OR gate 85 is supplied as D2 signals to a storage register 87 shown as having the seven data storage areas corresponding to the seven storage areas utilized in storage register 22 of FIG. 1. The register 87 has its outputs connected to comparator 79 in a manner substantially identical to that shown in the data scrambler 34 of FIG. 1, although the connections to an EXCLUSIVE OR gate 89 are slightly different than that shown in FIG. 1 for the connections to EXCLUSIVE OR gate 26. Rather, the second data bit position of storage means 87 is connected to one input of EXCLUSIVE OR gate 89, and its other input is obtained from bit position 7 of the storage register 87. EXCLUSIVE OR gate 89 provides an X output on a lead 91 to a second input of EXCLUSIVE OR gate 77. The comparator 79 provides output signals indicative of the results of the comparison on all of its inputs to an EXCLUSIVE OR gate 93. A second input of EXCLUSIVE OR gate 93 is connected to a logic 1 source. As long as the logic 1 source is applied to the second input of EXCLUSIVE OR gate 93, it acts to merely invert any input obtained from comparator 79. An output lead 95 supplies signals PT to a second input of EXCLUSIVE OR gate 85.

FIG. 3 provides indications of the logic value of various points in the circuit. The headings D, D1 and D2 represent the data at the associated places as does X and PT. The register positions 1 through 7 represent the corresponding positions in registers 22 or 87. The rows of logic values A through H represent the logic values of D1, D2, X and PT given the values of D and the register logic values 1 through 7.

OPERATION

As will be realized, there are often instances where downstream equipment utilize synchronizing circuits which cannot synchronize to the signal unless there are logic level changes in the data on some type of periodic basis. Thus, data scramblers are utilized at various points in the system circuitry to make sure that there is never a condition of all logic 0's or all logic 1's. This acts to prevent a data synchronizer from varying in frequency enough to cause problems.

As is also known by those skilled in the art, an EXCLUSIVE OR gate with a logic 0 on one input gate will merely pass data from the other input to the output with no alteration. On the other hand, the data is always inverted as it passes through an EXCLUSIVE OR gate if the other lead of the gate is permanently connected to a logic 1. Using this line of reasoning, it will be noted that the output data from EXCLUSIVE OR gate 12 is always the same as the input data on lead 10, as long as the X output of EXCLUSIVE OR gate 26 remains at a logic 0. Since EXCLUSIVE OR gate 26 is monitoring bit positions 6 and 7 of register 22, it will provide a logic 1 output only when one of bit positions 6 and 7 is a logic 1 and the other is a logic 0. The present invention, as previously mentioned, monitors or detects the "problem" conditions of the scrambler being locked into a condition where it maintains a continuous series of alternating logic bits regardless of the data input. If the monitored set of logic bits supplied to EXCLUSIVE OR gate 26 are of opposite values, EXCLUSIVE OR gate 12 will alter the value of the output signal 16 relative to data in 10.

The comparator 14, as previously mentioned, provides a logic 1 on the PT output lead 32 whenever all the inputs have a comparison indication of compared logic bits being identical values. Thus, comparator 14 operates to detect one of the four conditions shown in FIG. 3 of all logic 0's as shown in rows A and B, all logic 1's as shown in G or H, or two different combinations of alternating logic values as shown in rows C through F. By following the leads shown in FIG. 1, it will be noted that the first comparison in comparator 34 is of logic bit 1 and logic bit 7. In observing FIG. 3, it will be noted that each of these areas provides a like comparison of two logic 0's or two logic 1's. The second comparison is of logic bit 2 and logic bit 6. This again provides the same like set of values as illustrated in FIG. 3. In comparison 7 the comparison is between the last stored bit in the register 22 and the next bit received to ascertain whether or not the next bit received is of a logic value that will break the problem condition. If it is not of the appropriate logic value to break it, an output will be provided on lead 32 of a logic 1 value to invert D1 to form D2, so that the next bit will result in a stored set of bits that do not perpetuate the problem condition. If the conditions of row A in FIG. 3 are assumed where it is detected that there are all logic 0's in bit positions 1 through 7 of register 22, and the next data bit D on lead 10 is also a logic 0, such a logic bit would perpetuate the "problem" condition of all logic 0's and be maintained as such. Thus, all the comparisons are equal and a logic 1 appears on lead 32 as output PT, and the data bit D1 is changed from a logic 0 to a logic 1. This is illustrated under the headings D1 and D2 in FIG. 3 for row A. If, on the other hand, when the condition of all stored values in register 22 is a logic 0, and the next incoming data bit is a logic 1, such a condition would indicate that the "problem" condition would be broken by that data bit and no output is provided on lead 32, since there is no longer a comparison of all the values. In other words, the Q7 input is a logic 0, but the P7 input from lead 10 is a logic 1. Therefore, there is no longer a complete unity of comparison values and the output of comparator 14 is a logic 1, and after inversion by inverter 30 provides a logic 0 on lead 32. Lead 32 is the output labeled PT in both FIG. 1 and FIG. 3. Thus, upon the next clock appearing on lead 24, the logic 1, unaltered as illustrated in row B of FIG. 3, is entered into the register, and there is now a logic 1 in position 1 and logic 0's in the remaining positions.

If, on the other hand, the register 22 contains alternating values of logic 1 and logic 0 as shown in row C of FIG. 3, and the next incoming data bit is a logic 0, there will be a comparison in the comparator position Q7 P7 of comparator 14, and there will be a logic 1 on lead 32 since the next bit to be entered will have been altered by the logic 1 on lead 28 indicating a lack of comparison in logic values between bit positions 6 and 7 of register 22 as detected by the X bit detector 26. This detected position has already changed the incoming logic 0 on lead 10 to a logic 1 on lead 16, as shown under the caption D1 in FIG. 3. The detection of all like bits by comparator 14 then returns the logic 1 signal of D1 on lead 16 back to a logic 0 for the D2 output of EXCLUSIVE OR gate 20, so that a logic 0 will be entered on the next clock operation, thereby breaking the continuous logic 1/logic 0 alternating bit pattern previously contained in register 22. On the other hand, if a logic 1 were applied on lead 10, there would now be no comparison between it ano the first bit, and the fact that the X bit caused an alteration from logic 1 to logic 0 as shown in row D of FIG. 3, would again without alteration between D1 and D2, insert a logic 0 in register 22 and again break the pattern.

The above approach can be utilized in ascertaining that the other two problems shown in rows E through H of FIG. 3 will also occur as indicated.

The descrambler 18 of FIG. 1 operates on very similar logic even though the circuitry is not the mirror image of that for scrambler 34. The same reasoning is utilized and the same logic process will prove to anyone skilled in the art that it does descramble the signal to provide an output on 44 which is identical to that previously supplied to data input lead 10.

If larger sets of data need to be compared, comparators can be cascaded as can the registers for storing the information. In such a case, the input 81 of FIG. 2 would receive the output data from the comparator in the previous stage, and the data being held in the last bit position of the register section shown in FIG. 2, would be supplied to the first bit position of the following register stage. FIG. 2 also illustrates that the device used to check two or more of the bit positions does not require adjacent bit positions since they are shown to be checking bit positions 2 and 7 in FIG. 2. This again accomplishes exactly the same end result, and the chart of FIG. 3 can be used equally applicable to FIG. 2 as it was to FIG. 1. With more complicated logic circuitry, more bit positions than just the two could be used by circuitry for generating the X bit, but while proper operation in accordance with the advantages of the present invention can be realized, using greater numbers of bits for generating the X term only increases further the error multiplication that occurs for all such descramblers.

It is thus believed that the circuitry illustrated provides a new and novel way of scrambling data, while detecting conditions that would have caused problems in prior art scramblers, and that these problems are automatically resolved to maintain a scrambled data pattern at the output which can be properly interpreted and descrambled by a remote descrambler, thus allowing downstream synchronizing circuits to remain synchronized and permitting downstream data detectors to detect the prope and appropriate data as originally supplied to the scrambling circuit.

It is therefore my wish to be limited not by the specific embodiments illustrated and described as examples of a practice of the present invention, but only by the scope of the appended claims, wherein I claim:

1. Data signal scrambling apparatus comprising, in combination:

serial in/parallel out data storage first means for temporarily storing data wherein the data output at output taps thereof can range from the most recently stored Q1 to the oldest stored Qn;

decision second means, including first and second input means and output means where signals D received at said first input means thereof are passed to said output means thereof as signals D1 thereof modified in accordance with signals X received at said second input thereof;

exclusive OR third means connected between said first and second means for supplying signals X to said second means in accordance with the relative logic values of given output taps of said first means;

decision fourth means, including first and second input means and output means where signals D1 received at said first input means thereof are passed to said output means thereof as signals D2 thereof modified in accordance with signals PT received at said second input thereof;

input signal fifth means, connected to said second means for supplying input signals D to said second means;

decision sixth means, including input means connected to said first and fifth means for receiving D and at least some of Q1 through Qn signals and output means connected to said second input means of said fourth means for supplying signals PT thereto, said sixth means generating said signal PT in accordance with comparisons of selected pairs of input signals; and apparatus output means, connected to said output means of said second means for providing scrambled output D1 signals 2. Scrambled data generating apparatus comprising, in combination:

input first means for supplying a data signal Dm to be scrambled; and logic second means, including output means and first input means connected to said first means to receive signals Dm therefrom, for generating an output signal D1m at said output means thereof wherein D1m equals the exclusive OR logical combination of Dm, D2m−j, and D2m−n with D2m−j and D2m−n being signals internally generated j and n bit time periods earlier and temporarily stored wherein at the time of generation the D2m bit signal is generated in accordance with the following rules, (1) When no pattern in a given set of patterns is detected in the previously generated set of stored bits, then D2m is the exclusive OR logical combination of Dm, D2m−j and D2m−n (2) When a pattern in said given set of patterns is detected in the previously generated set of stored bits, then (a) D2m is set to the opposite logic value of the previously generated D2m bit when the detected pattern is "all bits alike"

(b) D2m is set to the same logic value as the previously generated D2m bit when the detected pattern is "alternate bits opposite".

3. Signal scrambling apparatus comprising, in combination:

serial data bit stream signal storage first means including data input means and data output means;

data signal input second means for supplying a signal to be monitored and scrambled;

bit pattern detection logic third means, including input means connected to said data output means of said first means, input means connected to said second means and including apparatus signal output means, for supplying signals to a remote descrambler, the signal output by said third means differing from that supplied by said second means in accordance with the logic values of at least two of the signal bits stored in said storage first means; and same logic value and alternating logic value bit pattern detection logic fourth means, including input means connected to said data output means of said first means, input means connected to said apparatus signal output means of said second means and output means connected to said third means for breaking data patterns by modifying data bits supplied to said first means whereby in the alternative (a) a bit having a logic value opposite those stored is inserted into said first means when said fourth means detects that all the bits stored in said first means have the same logic value and (b) a bit having a logic value which has the same logic value as the last bit stored in said first means is inserted into said first means when said fourth means detects that all the bits stored in said first means have alternating logic values.

4. Apparatus as claimed in claim 3 comprising, in addition:
   remote descrambling fifth means for returning the logic value of received signals to the same serial bit stream logic value as supplied by said second means; and
   communication means, connected to said apparatus output means of said third means and said fifth means, for supplying signals output by said third means to said fifth means for descrambling.

5. Data scrambling apparatus comprising, in combination:
   first means for supplying data to be scrambled;
   data storage second means for storing data previously output by the apparatus;
   scrambled output data third means;
   data monitoring fourth means, connected to said, second and third means, for altering the logic value of data supplied by said first means before being output by said third means when data stored in given bit positions in said second means has given relative logic values; and
   data monitoring fifth means, connected to said first, second and third means, for detecting a plurality of given stored logic conditions and for altering the logic value of data transferred from said third means to said second means in accordance with detected logic bit values such that the given stored logic condition is not perpetuated.

* * * * *